(12) United States Patent
Edison et al.

(10) Patent No.: US 12,521,061 B2
(45) Date of Patent: Jan. 13, 2026

(54) METHOD OF DETERMINING THE EFFECTIVENESS OF A TREATMENT ON A FACE

(71) Applicant: Kenvue Brands LLC, Summit, NJ (US)

(72) Inventors: Brenda Edison, Skillman, NJ (US); Thomas Shyr, Skillman, NJ (US); Neena Tierney, Skillman, NJ (US)

(73) Assignee: Kenvue Brands LLC, Summit, NJ (US)

( * ) Notice: Subject to any disclaimer, the term of this patent is extended or adjusted under 35 U.S.C. 154(b) by 203 days.

(21) Appl. No.: 18/286,162

(22) PCT Filed: Apr. 8, 2022

(86) PCT No.: PCT/IB2022/053319
§ 371 (c)(1),
(2) Date: Oct. 9, 2023

(87) PCT Pub. No.: WO2022/215046
PCT Pub. Date: Oct. 13, 2022

(65) Prior Publication Data
US 2024/0188887 A1     Jun. 13, 2024

Related U.S. Application Data

(60) Provisional application No. 63/173,261, filed on Apr. 9, 2021.

(51) Int. Cl.
*A61B 5/00* (2006.01)
*G06T 7/00* (2017.01)
*G06T 7/60* (2017.01)

(52) U.S. Cl.
CPC .......... *A61B 5/4848* (2013.01); *G06T 7/0016* (2013.01); *G06T 7/60* (2013.01);
(Continued)

(58) Field of Classification Search
CPC ... A61B 5/4848; A61B 5/4836; A61B 5/0077; A61B 5/1079; A61B 5/1071;
(Continued)

(56) References Cited

U.S. PATENT DOCUMENTS 9,067,969 B2    6/2015   Yu et al.
2017/0296461 A1*  10/2017  Osorio .................. A61K 8/602

FOREIGN PATENT DOCUMENTS

JP    H11265443 A    9/1999
JP    2001331791 A   11/2001
(Continued)

OTHER PUBLICATIONS

Davis E. King. Dlib-ml: A Machine Learning Toolkit. Journal of Machine Learning Research 10, pp. 1755-1758, 2009.
(Continued)

*Primary Examiner* — Edward Park
*Assistant Examiner* — Alexander Joseph Vaughn
(74) *Attorney, Agent, or Firm* — Rachel Chaves

(57) ABSTRACT

Provided are methods of determining effectiveness of face treatments comprising: providing a front-facing image of the face prior to use of the treatment; identifying a y-axis of the face, wherein the y-axis is defined by a line connecting the center position of the chin of the face through the center of the face; identifying an x-axis of the face, wherein the x-axis is defined by a line that is positioned at a 90-degree angle from the y-axis and goes through the center of the chin of the face; selecting a facial landmark; identifying a facial landmark line, wherein the facial landmark line is defined by a line connecting the center position of the chin of the face to the facial landmark; measuring the angle between the x-axis and the facial landmark line; carrying out the treatment on the face; providing a front-facing image of the face after the treatment.

13 Claims, 4 Drawing Sheets

(52) U.S. Cl.
CPC ............... *G06T 2207/30004* (2013.01); *G06T 2207/30201* (2013.01)

(58) Field of Classification Search
CPC ..................... G06T 7/0016; G06T 7/60; G06T 2207/30004; G06T 2207/30201; G16H 20/10; G16H 20/40
See application file for complete search history.

(56) References Cited

FOREIGN PATENT DOCUMENTS

| | | | |
|---|---|---|---|
| JP | 2008029573 A | * | 2/2008 |
| JP | 2013059529 A | | 4/2013 |
| WO | WO 2013/040443 A2 | | 3/2013 |
| WO | WO 2013040443 A3 | | 3/2013 |
| WO | WO 2021/257924 A1 | | 12/2021 |

OTHER PUBLICATIONS

PCT Search Report and Written Opinion dated Oct. 10, 2023 for PCT/IB2022/053319. (10 pages).

* cited by examiner

METHOD OF DETERMINING THE EFFECTIVENESS OF A TREATMENT ON A FACE

CROSS-REFERENCE TO RELATED APPLICATIONS

This application is the national phase filing under 35 USC 371 of international application PCT/IB2022/053319 filed on Apr. 8, 2022, which claims the benefit of U.S. application 63/173,261 filed Apr. 9, 2021, the complete disclosures of which are hereby incorporated herein by reference for all purposes.

FIELD OF THE INVENTION

The present invention relates to methods of assessing improvement of skin by the use of various products, and making modifications to the use thereof as needed or desired.

BACKGROUND

Humans often desire a youthful look, particularly as they age and certain features begin to show signs of such aging. In particular, aging facial features may sometimes be considered undesirable, and users seek to reverse or otherwise modify these signs of aging. One simple measure of aging skin is referred to as the triangle of youth. The triangle of youth is a substantially triangular shape as measured by the lines formed between the cheek bones to the center of the chin. A "youthful" triangle is considered with an inverted triangular shape, where the lines connecting each cheek bone with the center of the chin form a smaller angle (i.e., high cheekbones, full cheeks and a well-defined jawline). A more aged triangle is associated with a wider angle, and may be considered to have flipped to form the "pyramid of age", as measured from the sides of the jawline to the center of the eyes.

Various products are available to help firm skin and help modify the signs of aging, but oftentimes the effectiveness of such products are difficult to discern. As such, it is difficult to know whether a certain regimen or certain product is effective at modifying the signs of aging. There is a need to develop a method that will allow objective measurements of effectiveness, and allow the user to modify a regimen or use of a product as needed.

SUMMARY

One aspect of the invention pertains to a method of determining the effectiveness of a treatment on a face having a jawline and a chin, the method comprising:
(a) providing a first front-facing image of the face prior to use of the treatment;
(b) identifying a y-axis of the face, wherein the y-axis is defined by a line connecting the center position of the chin of the face through the center of the face;
(c) identifying an x-axis of the face, wherein the x-axis is defined by a line that is positioned at a 90-degree angle from the y-axis and goes through the center of the chin of the face;
(d) selecting a facial landmark along the jawline of the face;
(e) identifying a facial landmark line, wherein the facial landmark line is defined by a line connecting the center position of the chin of the face to the facial landmark;
(f) measuring the angle between the x-axis and the facial landmark line;
(g) carrying out the treatment on the face;
(h) providing a second front-facing image of the face after the treatment; and
(i) repeating steps (b)-(f).

In one or more embodiments, the first front-facing image of the face after the treatment is taken at least one week after the treatment. In some embodiments, additional front-facing images are provided and steps (b)-(f) are repeated at regular intervals. In one or more embodiments, additional front-facing images are provided and steps (b)-(f) are repeated during a treatment period. In some embodiments, the method further comprises (j) comparing the angle between the x-axis and the facial landmark line before the treatment to the angle between the x-axis and the facial landmark line after the treatment. In one or more embodiments, the treatment comprises application of an anti-aging product. In some embodiments, the anti-aging product is a cream or lotion. In one or more embodiments, the anti-aging product comprises one or more anti-aging active ingredients. In some embodiments, the product is applied as part of a regimen. In one or more embodiments, the product and/or the regimen is modified after (i). In some embodiments, the modification is selected from the group consisting of using a different product in substitution for the first product, using a new product in addition to the first product, changing the regimen, or changing the amount of time the product is left on the face, and combinations thereof. In one or more embodiments, the treatment comprises an anti-aging procedure. In some embodiments, the anti-aging procedure is selected from the group consisting of injection of one or more fillers, plastic surgery, a peel treatment, a laser treatment, light treatments, and combinations thereof.

DETAILED DESCRIPTION

Figure 1B:
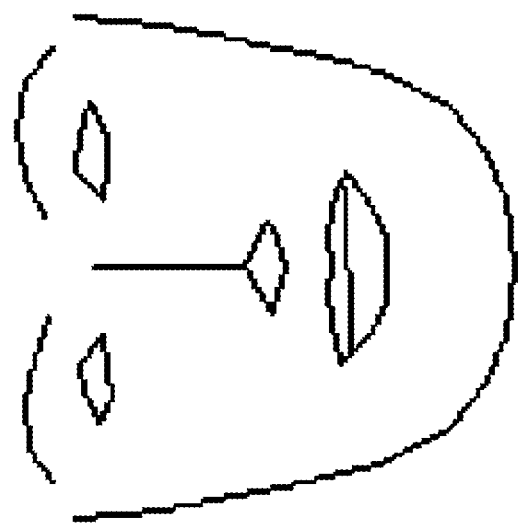
FIGS. 1A-B show a representation of a younger face and an older face, respectively.

The present invention relates to methods of determining the effectiveness of a product or regimen of using a product, and further relates to a method of using a product or modifying use of a product to effectively provide a benefit to the user. The desired benefit is referred to generally as reducing the signs of aging in the face of the user, which is described in more detail below. Any product or products that are intended to provide this benefit may be useful in the present invention, including certain anti-aging products described below.

Accordingly, one aspect of the invention pertains to a method of determining the effectiveness of a treatment on a face having a jawline and a chin, the method comprising:
(a) providing a first front-facing image of the face prior to use of the treatment;

(b) identifying a y-axis of the face, wherein the y-axis is defined by a line connecting the center position of the chin of the face through the center of the face;

(c) identifying an x-axis of the face, wherein the x-axis is defined by a line that is positioned at a 90-degree angle from the y-axis and goes through the center of the chin of the face;

(d) selecting a facial landmark;

(e) identifying a facial landmark line, wherein the facial landmark line is defined by a line connecting the center position of the chin of the face to the facial landmark;

(f) measuring the angle between the x-axis and the facial landmark line;

(g) carrying out the treatment on the face;

(h) providing a second front-facing image of the face after the treatment; and (i) repeating steps (b)-(f).

As used herein, "treatment" refers to any activity intended to have an effect on the skin of the face, particularly an anti-aging affect. Examples of treatments include, but are not limited to application of an anti-aging product, or an anti-aging procedure as further detailed below.

As used herein, "front-facing image" refers to an image of a face taken from the front such that the outline of either side of the face is substantially symmetrical (correcting for any naturally occurring asymmetries of the face). Preferably, front-facing images that are being compared should match as closely as possible in terms of symmetry.

As used herein, "center position of the chin of the face" refers to the lowest point appearing on the face in the front-facing image.

As used herein, "center of the face" refers to the midpoint of the widest part of the face. In further embodiments, the midpoint may be calculated as the average across multiple pairs of points on the right and left side of the face. That is, pairs of points along the jawline above and/or below the widest point of the face may be averaged out to calculate the center of the face.

As used herein, "facial landmark" refers to any point selected along the jawline of a face.

The human face has a number of features, and demonstrates various signs of aging as the individual grows older. Signs of aging include, for example, flattening of cheeks, drooping of skin over the cheeks, sagging of the jawline, lack of definition in the jawline, and fat accumulating between the neck and chin. A face that is deemed to have a youthful appearance is referred to as demonstrating the "triangle of youth", which is defined by lines connecting the cheekbones and center of chin. A face that is deemed to have a more aged appearance is referred to as demonstrating a pyramid of aging, which is defined by the lines connecting the sides of the jaw to the center of the eyes.

Figure 1A:
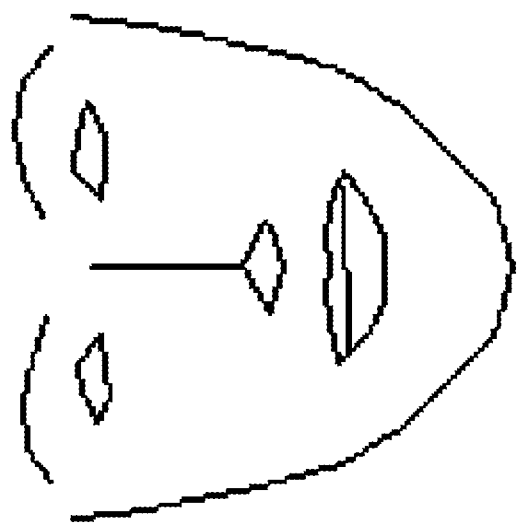

More youthful and younger-looking faces tend to have a more "reverse pyramidal" shape, associated with the triangle described above. This youthful shape is associated with a bigger angle, described below and shown in FIG. 1A. The face shown in FIG. 1A has a larger angle as measured up the face from the chin, while the face shown in FIG. 1B has a flatter angle as measured from the chin. The smaller, flatter angle of the face shown in FIG. 1B is associated with a more aged appearance. As this angle is increased, the effect is to reduce the visual sign of aging, and therefore provide the user with a more "youthful" look and appearance.

Because of this change in jawline angle due to the aging process, the jawline angle may also be effective as a measurement tool for age estimation, or to determine the effective improvement in age appearance after application of a product or after a treatment period. Thus, the jawline angle methods described herein are effective as a method to evaluate the user's face and determine whether an anti-aging treatment is needed or desired, for example, if the angle begins to decrease over time. In some instances, this may be useful as a pre-aging tool, helping a user even when that user has not previously undergone an anti-aging treatment or regimen. It is an objective of the present invention to evaluate the angle, described below, and determine its efficacy in reducing the sign of aging associated with the triangle of youth. By determining efficacy, modifications to a treatment may be made. This is described below in more detail.

In order to maintain a more youthful appearance, some individuals may wish to reduce the signs of aging and maintain the "triangle of youth" look. Some features of more youthful looking skin include more defined cheek bones, a volumized skin appearance, and a more contoured appearance of the jawline. Certain indicators of aging skin include a lessening of the flattened appearance of cheeks, appearance of nasolabial folds (drooping of skin over cheeks) and jawline sagging.

When an individual can improve the aging features or accentuate the youthful features, that individual may feel that their face and skin has a more pleasant aesthetic appearance. Improvement of skin features may be accomplished through the use of one or more skin products, or regimens of product applications, as described below. However, it is often difficult for a user to determine whether a certain product or regimen is effectively working. The present invention allows a user to more effectively and clearly identify whether that user's face is demonstrating a more youthful appearance, or reducing the signs of aging in the face.

Treatment of Signs of Aging

There are ways to treat the signs of aging, including methods, products, and regimens that can increase the angle as measured from the tip of the chin up the face (e.g., to the temples or ears of the individual). Products may include a variety of anti-aging products, which may be in the form of a lotion, cream, or other formats known in the art. Such anti-aging products may contain one or more anti-aging active ingredients, such as retinoids, hydroxy acids and peptides. Examples of retinoids include, but are not limited to, retinol, retinaldehyde, retinoic acid, retinyl palmitate, isotretinoin, tazarotene, bexarotene and Adapalene. In certain embodiments, the retinoid is retinol. Polyhydroxy acids are acids with multiple hydroxyl groups that can often act as moisturizers, anti-irritants and humectants. Examples of polyhydroxy acid include, but are not limited to, gluconic acid lactones and aldonic acid lactones such as allonolactone, altronolactone, gluconolactone, glucoheptonolactone, mannolactone, gulonolactone, idonolactone, galactonolactone, talonolactone, lactobionic acid, maltobionic acid, and tartaric acid. Alpha hydroxy acids are compounds which contain a carboxylic acid that is substituted with a hydroxyl group on the adjacent carbon atom. Examples of alpha hydroxy acids include, but are not limited to, glycolic acid, malic acid, tartaric acid, pyuric acid, mandelic acid, or any combination of any of the foregoing. One example of a peptide includes dipeptides, such as those N-acyldipeptide derivatives described and disclosed in U.S. Pat. No. 9,067,969, the entire contents of which are disclosed herein by reference. Other cosmetic ingredients and formulations are available that can help tighten skin, or reduce the signs of aging. Some of these products are applied once per day, some may be applied twice per day, some may be applied more than twice per day, either at regular or irregular intervals. Some products may be left on the skin or some may be removed after a certain length of time post-application. The regimen of application of such products may vary depending upon their effectiveness and desired impact.

It is desired, however, to modify the use of such products depending upon the effectiveness of the product. In some instances, a product may be effective for one user by applying the product once per day, however, the same product may give the same effectiveness to a different user by applying the product twice per day. It would be useful to understand the effectiveness of a certain product or regimen as it is used by a particular user, and modify the product and/or regimen depending upon the actual effectiveness in that user. In addition, the method described herein may be useful in determining the effectiveness of a certain product or regimen as it used by a population or group of individuals, thereby to evaluate whether the product or regimen is successful in reducing the signs of aging. Further, the method may be useful to provide direction to modify the product and/or regimen depending upon that effectiveness over the group of individuals. This innovation provides a method of providing or modifying a product and/or regimen to help provide improved effectiveness to a specific user, and in some instances, the method may help generate a specific product to use for a particular user. In some aspects, the product may include a specific ingredient or ingredients, or may include a specific level of an ingredient or ingredients. In some aspects, the method may help determine the regimen of application of a product, e.g., where a specific user may apply the product one time per day, or two times per day, or more than two times per day.

Method of Determining Effectiveness

There is provided herein a method of determining the effectiveness of a product, series of products, or regimens intended to have an impact on the signs of aging. The method not only may aid a user in determining whether the product or regimen is effective in improving the signs of aging, but may also help guide a user to modify the product, products, or regimen(s) that the user is following. The method may be repeated to determine effectiveness over time, or as changes are made to the product(s) or regimen(s).

Figure 2A:
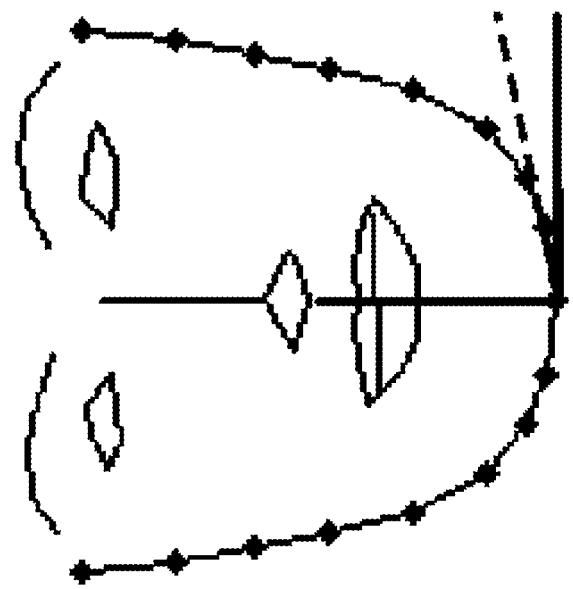
FIGS. 2A-B show a representation of a face with a depiction of jawline angle and with various facial landmarks, respectively.

The method of determining the angle of the jawline of the user, e.g., the bottom point in the triangle of youth, begins with using an algorithm to estimate the face's jawline landmark positions from front facing images. A coordinate system can be defined using the position of the chin as a reference point. With the position of the chin, a line from the center of the chin to the center of the face can be determined and set as the y-axis. The x-axis is then defined as a line from the center of the chin at a 90-degree angle from the y-axis. The x-axis and y-axis can be seen in FIG. 2. One or more jawline angles can be computed between the line formed from the chin to any detected jawline landmarks with respect to the x-axis as seen in FIG. 2. Desirably, for consistent jawline angle measurement, the angles for a particular user should be computed with the same jawline landmarks, and desirably the measurement is made from time series frontal face images with consistent facial pose and camera focal length.

As the method above described, the angle measurement can be applied to any frontal facial images with the jawline clearly visible and unobstructed. Although frontal facial images are described herein, using the jawline, it is contemplated that other angles may be useful in determining effectiveness of a product or regimen, using different points of reference, such as the side, top, or bottom of the face.

The step of determining the angle may be taken one or more times during a "treatment period", which is the period of time where a user is applying a product to help treat the signs of aging. For example, the treatment period may be from the start of an application of an anti-aging product (or immediately prior to the start of such application) to completion of such application, which may be days, weeks, months, or even years. The method includes assessing the efficacy of the treatment of the signs of aging and, if necessary, modifying the product and/or the regimen of application of the product.

During the treatment period, and optionally prior to or after the treatment period, treatment efficacy may be assessed and analyzed by computing the jawline angle from consistent acquired frontal face images over time. Depending upon the desired outcome, a change in the angle may be seen as an improvement indicating that the product and/or regimen was successful in treating the signs of aging. For example, the angle may be measured every day, or after a set number of days of consistent use. In some aspects, the change in angle is determined to be effective, and in this aspect, the user may continue to use the product as the user had been using it. It may be desired to repeat the angle measurement after another set time period (e.g., daily, or after a set number of days), to determine continued effectiveness. Alternatively, if the full desired outcome was met, the user may choose to discontinue use of the product. Even after discontinuing use of the product, angle measurement steps may be taken to determine whether the effectiveness is maintained after use.

However, if the change in angle is determined to not be as large as desired for an effective outcome after the time period intended, then the aging improvement may be considered not as effective as desired. In this instance, the user may modify the treatment provided, including one or more of: adding or substituting products or ingredients, using a stronger form of the product, or modifying the regimen of application (e.g., use the product more often or at different time periods). Effectiveness of the product and/or regimen is determined by the change in the angle, but determination of whether the particular product or regimen is effective may depend upon the desired outcome, and may vary from person to person. For example, in one user, a desired angle modification over a set period of time may be 0.1 degree, but in another user, a desired angle modification over the same set period of time may be 0.5 degrees or more.

Effectiveness of the product and/or regimen may be defined as an angle change of at least 0.1 degrees, or may be an angle change of at least 0.5 degree, or may be an angle change of at least 1 degree after a set period of time. Alternatively, effectiveness of the product and/or regimen may be defined as an angle that has increased by at least 1% compared to the starting angle, or an angle that has increased by at least 3% compared to the starting angle, or an angle that has increased by at least 5% compared to the starting angle. Again, the desired angle change is after a set period of time after the treatment period has begun, which may be one day, may be one week, may be one month, may be two months, may be three months, or may be any other desired period of time. In aspects where the effectiveness is determined for a group of individuals or a population of users, effectiveness may be defined as a statistically significant improvement over the group of users.

By way of nonlimiting example, a user may have a starting jawline angle of 14.0 degrees prior to the start of the treatment period, and after 8 weeks of application with a topical leave-on composition having 0.1% benefit ingredient, at a rate of one time per day, the resulting angle may be 14.7 degrees. If effectiveness is defined as an increase in the angle of at least 0.5 degrees compared to the starting angle after 8 weeks, then the product and regimen may be deemed effective, and no change to the product or regimen is needed. The user may end the regimen, or may continue the regimen as desired. However, if effectiveness is defined as an increase in the angle of at least 1.0 degrees compared to the starting angle after 8 weeks, the product and regimen may be deemed ineffective, and the user may modify the treatment. For example, the user may use a product that has a higher amount of benefit ingredient, or may apply the product more often, or may add an additional product to the regimen, or may be replace the benefit ingredient with an alternative product.

By way of nonlimiting example, a user may have a starting jawline angle of 14.0 degrees, and after 8 weeks of application with a composition having 0.1% benefit ingredient in the product, at a rate of one time per day, the resulting angle may be 14.7 degrees. If effectiveness is defined as an increase in the angle of at least 5% compared to the starting angle after 8 weeks, then the product and regimen may be deemed effective, and no change to the product or regimen is needed. The user may end the regimen, or may continue the regimen as desired. However, if effectiveness is defined as an increase in the angle of at least 10% compared to the starting angle after 8 weeks, the product and regimen may be deemed ineffective, and the user may modify the treatment. For example, the user may use a product that has a higher amount of benefit ingredient, or may apply the product more often, or may add an additional product to the regimen, or may be replace the benefit ingredient with an alternative product.

In some embodiments, the method may be useful to evaluate the effectiveness and need for modification of treatments other than topical formulations. For example, it is known that individuals seek to improve the look of their facial features through injection of fillers, cosmetic procedures or the like. The methods described herein may be useful in determining whether such methods of treatment are effective. As such, the method may compare the angle before and after the injection of a filler, or before and after the cosmetic procedure. Angle measurements may be taken over a length of time or various lengths of time to determine how long the intended benefit result remains in the individual, and may determine when the user may receive another treatment (e.g., injection of a filler).

Modification of Treatment

The inventive method described herein is useful in determining whether a treatment (e.g., application of a cosmetic or therapeutic product(s) and/or treatment regimen) is effective to reduce the signs of aging. The effectiveness of the treatment may be informative to the user, and in some aspects, the method may further include the step of modifying the treatment depending upon the determination of effectiveness of the product or regimen. Treatment may include one or more cosmetic treatments or cosmetic procedures. For example, a treatment may include injection of one or more fillers, cosmetic procedures (including plastic surgery), the use of peel treatment, laser treatments, or light treatments. Treatment may also, or may alternatively, include the application of one or more cosmetic products to the facial skin of the user, resulting in the cosmetic effect of reducing one or more signs of aging. The measurement may be taken at any time during the treatment period, and compared to a baseline angle (the baseline angle being defined as an angle prior to the treatment period).

The method may include the step of modifying the treatment. As noted above, treatment, as used herein, includes application of one or more cosmetic products to the facial skin of the user at set times, where the product or products have a certain amount of benefit ingredient therein. Modifying the treatment may include, for example, using a different product in substitution for the product being evaluated. Or it may include using a new product in addition to the product being evaluated. The modification may include leaving the product on the facial skin of the user for a longer or shorter time period than the time period being evaluated. The modification may include changing the amount of the benefit ingredient(s) in the product being evaluated. The modification may include changing the regimen currently being used for the product being evaluated. Changing the regimen may include, for example, applying more or less of the product, or applying the product more frequently or less frequently, or changing the order of application of products, or changing the product/products used. It may be desired to measure the angle more than one time during the treatment period to determine continued effectiveness.

It may be desired to measure the angle one or more times after the treatment period is completed, so as to determine whether the user should undergo another treatment. For example, the treatment may have been deemed effective, and it may have been determined that no further treatment is required, but after a period of time (e.g., three months, six months, one year, or other period), the effectiveness is determined to be reduced. At this time, the user may choose to repeat the treatment, or may choose to undergo a different treatment. A new treatment period may begin, and the method described herein may be repeated for the new treatment.

It may be desired to compile data regarding effectiveness of a product and/or a regimen and communicate this effectiveness level and method of determining as described herein, such as with advertising or marketing of the product and/or regimen. In some aspects, the level of efficacy may be associated with a product or packaging, such as on its label.

Method

One method of the present innovation includes one or more of the following steps. The method may include taking an image of the face of the user to which an anti-aging product should be applied, and establishing a set of points as set forth in FIG. 2 above. The center of the chin is determined, and the x-axis and y-axis are determined. An angle from the center of the chin to a desired point on the jawline is measured compared to the x-axis, and the angle is set as the initial baseline. The treatment period then begins, where a user applies a product or products at set time periods, or other treatment described above is performed on the face. For example, the set time period may be daily or multiple times per day. After a desired time period (e.g., one day, several days, one week, several weeks), the angle is again measured and compared to the initial baseline. The difference between the baseline angle and the measured angle is calculated, and compared to a desired change in the angle. In some aspects, the desired change in the angle is greater than the actual change in the angle (resulting in a finding of ineffective treatment), and in some aspects the desired change in the angle is equal to or less than the actual change in the angle (resulting in a finding of effective treatment).

If the desired change in the angle is greater than the actual change in the angle, then a modification to the product and/or regimen may be made. The modification can be any modifications set forth above, such as changing the amount of or frequency of product applied to the skin, or replacing with a different product, or adding another product to the regimen, or increasing or decreasing the active amount of the benefit ingredient, or alternatively, other non-topical treatments may be performed as described above. After another desired time period (e.g., one day, several days, one week, several weeks), the angle is again measured and compared to the baseline, as well as to any other angle measurements taken. For example, it may be useful to compare the new angle measurement to the most recent previous angle measurement, and determine the change. If the desired change in the angle is greater than the actual change in the angle, then another modification to the product and/or regimen may be made.

The angle measurement and comparison may be repeated as many times as needed, until a desired angle change is seen. The product and/or regimen may be modified as needed to provide a product and/or regimen that results in an angle change that is equal to or close to the desired angle change. Once a desired angle change is met, the treatment period may end, if desired. In some aspects, at a certain period after the treatment period is ended, the angle may be determined again to evaluate whether the effective reduction in the signs of aging have been lessened (indicating signs of aging). If the angle demonstrates that the reduced signs of aging are no longer present, or have lost their effectiveness, the user may choose to undergo another treatment period, either with the same or a different product and/or regimen. In this aspect, the method described herein may be repeated if desired.

EXAMPLES

Example 1—Evaluation of Jawline Angles Before and After Product Use 42 subjects were evaluated at three time periods (baseline, week 6 and week 16). At each time period, facial imaging was taken and evaluated. Four of the subjects had no images at week 16, and therefore the final numbers generated were for 38 subjects.

Frontal face images were used to detect facial landmarks and compute jawline angles, in accordance with one or more embodiments of the invention. First, 68 facial landmarks (see FIG. 2B) are automatically detected from the frontal face image using the "face landmark detection" algorithm contained in publicly available DLIB library (Davis E. King. Dlib-ml: A Machine Learning Toolkit. Journal of Machine Learning Research 10, pp. 1755-1758, 2009).

Figure 2B:
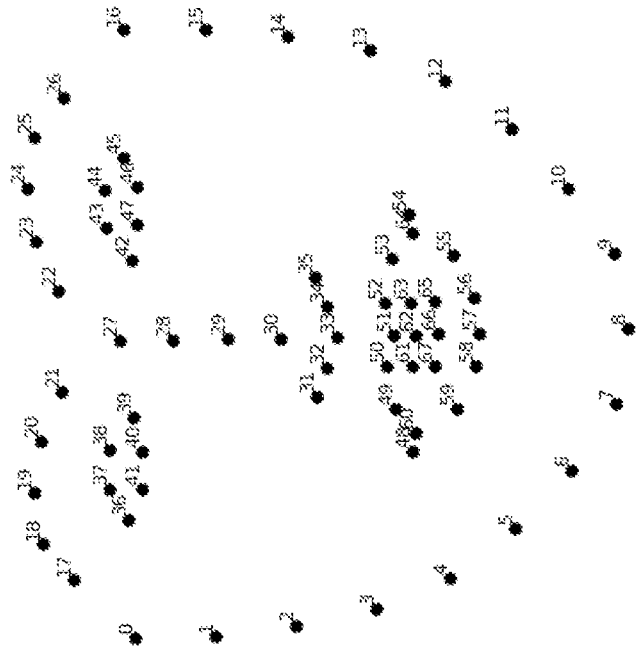

Second, the Y-axis (median plane) was determined based on point #8 shown on FIG. 2B (center position of the chin) and the average of all landmark points (center of the face). The X-axis was drawn at 90 degree angle from the Y-axis.

Third, the jawline angle is computed between the line formed from point #8 and point #10 and the X-axis.

The jawline angles were used to evaluate angle at each time period and determine effectiveness of the product. As noted above, an increased angle was determined to be associated with an increased youthful appearance (and therefore reduction in the sign of aging).

Each user in this test used a commercially available anti-aging facial cream. This product was expected to give an improvement in the signs of aging, and therefore is useful in evaluating the test method described herein. Specifically, the product was expected to provide an average improvement in the angle of 0.56 after week 6, and 0.64 after week 16, of product usage. The product was applied to the face of the user, as indicated by the product, two times per day. The product was rubbed into the skin and left on without removal.

In all, the average angle at baseline was 15.52 degrees, and at week 6 the average angle was 16.09, and at week 16 the average angle was 16.17 degrees. The improvement in angle measurements at week 6 and week 16 degrees was significantly different from baseline and was determined to be effective. This demonstrates that the method of angle measurement described herein is accurate and capable of determining effectiveness.

As described above, while this study demonstrated that the product was effective in its use and regimen, in the event that the angle did not improve to a desired amount, the treatment used could be modified as desired or necessary. Modifications could include one or more of: adding another product, substituting with a different product, modifying the product used to either increase or decrease the percentage of benefit ingredient, or modifying the regimen to use the product more often or less often. It may be useful to take angle measurements more often to modify the product and/or regimen, if desired. Measurements taken at six weeks and sixteen weeks after beginning of treatment may be sufficient or may be modified to take measurements more or less frequently, or after a longer duration (such as with a longer treatment period).

Example 2—Jawline Angle Computations Based on the Cross-Age Celebrity Dataset

With recent advances in computer vision, researchers have gathered various datasets containing publicly available facial images with their respective age. One such dataset is the Cross-Age Celebrity Dataset (CACD), which contains over 160,000 images from 2,000 celebrities collected from the Internet with age ranging from 16 to 62. Out of the 160,000 images, 50,852 images were clear frontal face images. Using the jawline angle analysis method described in Example 1, the jawline angle was computed for each image and the average results are grouped per age interval of 10 years.

Figure 3:
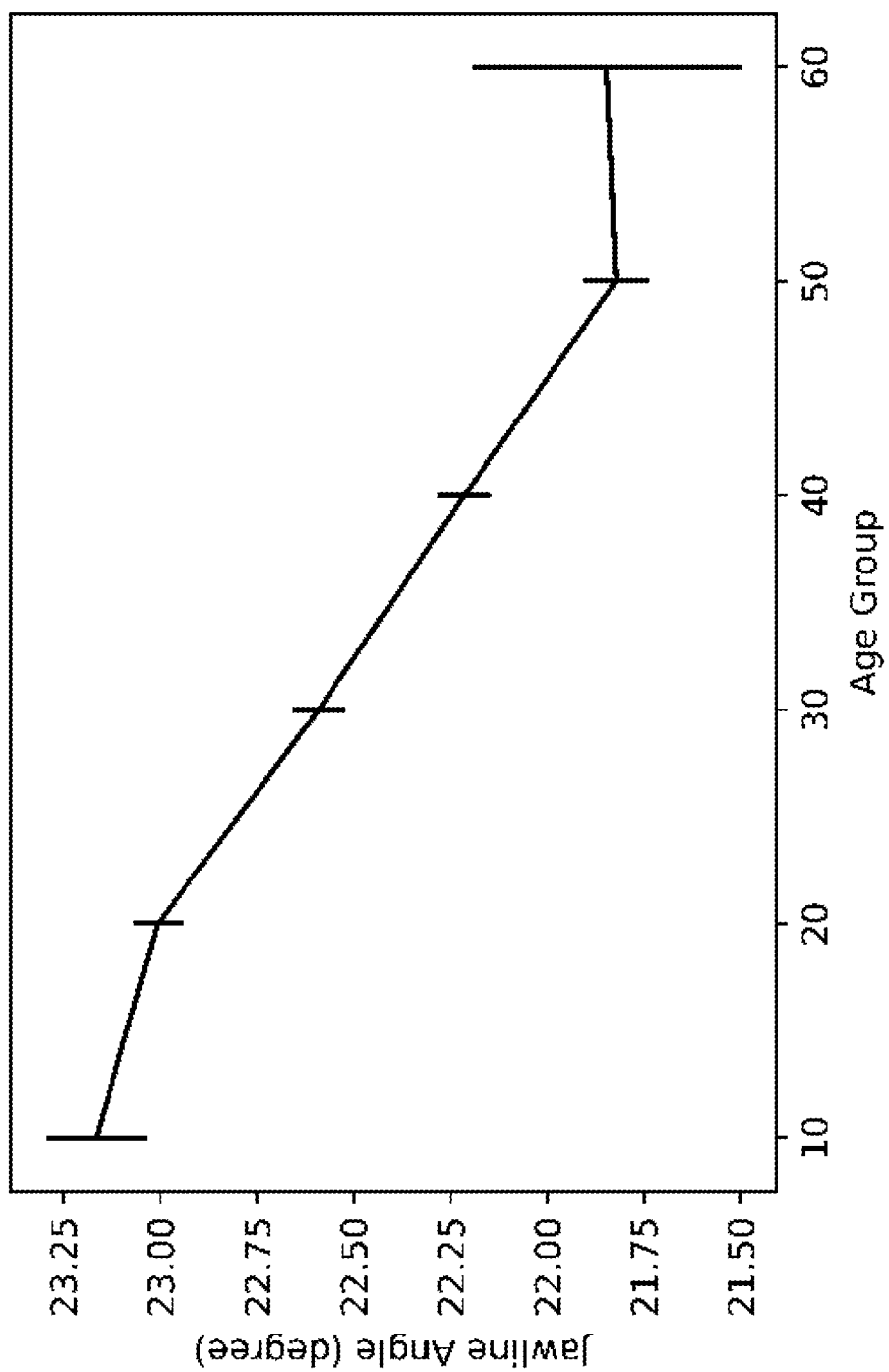
FIG. 3 shows the calculated average jawline angle for various age brackets based on analysis of frontal images from the publicly available CACD dataset.

The average jawline angles are 23.17, 23.01, 22.59, 22.21, 21.82, and 21.84 for age groups 11-20, 21-30, 31-40, 41-50, 51-60, and 61-70 year olds, respectively. The jawline angle can be seen to consistently decrease with age at roughly about 0.5 degrees every 10 years. FIG. 3 shows the results graphically, with the average jawline angle for each age bracket (11-20, 21-30, 31-40, 41-50, 51-60, 61+) based on analysis of frontal images from publicly available CACD dataset. The error bar represents 95% confidence interval. The jawline angle is able to capture the loss of youthful appearance from the triangle of youth as seen in FIG. 3. This demonstrates that the angle decreases over time, demonstrating that the angle is associated with aging.

Example 3—Jawline Angle Computations Based on FairFace

Figure 4:
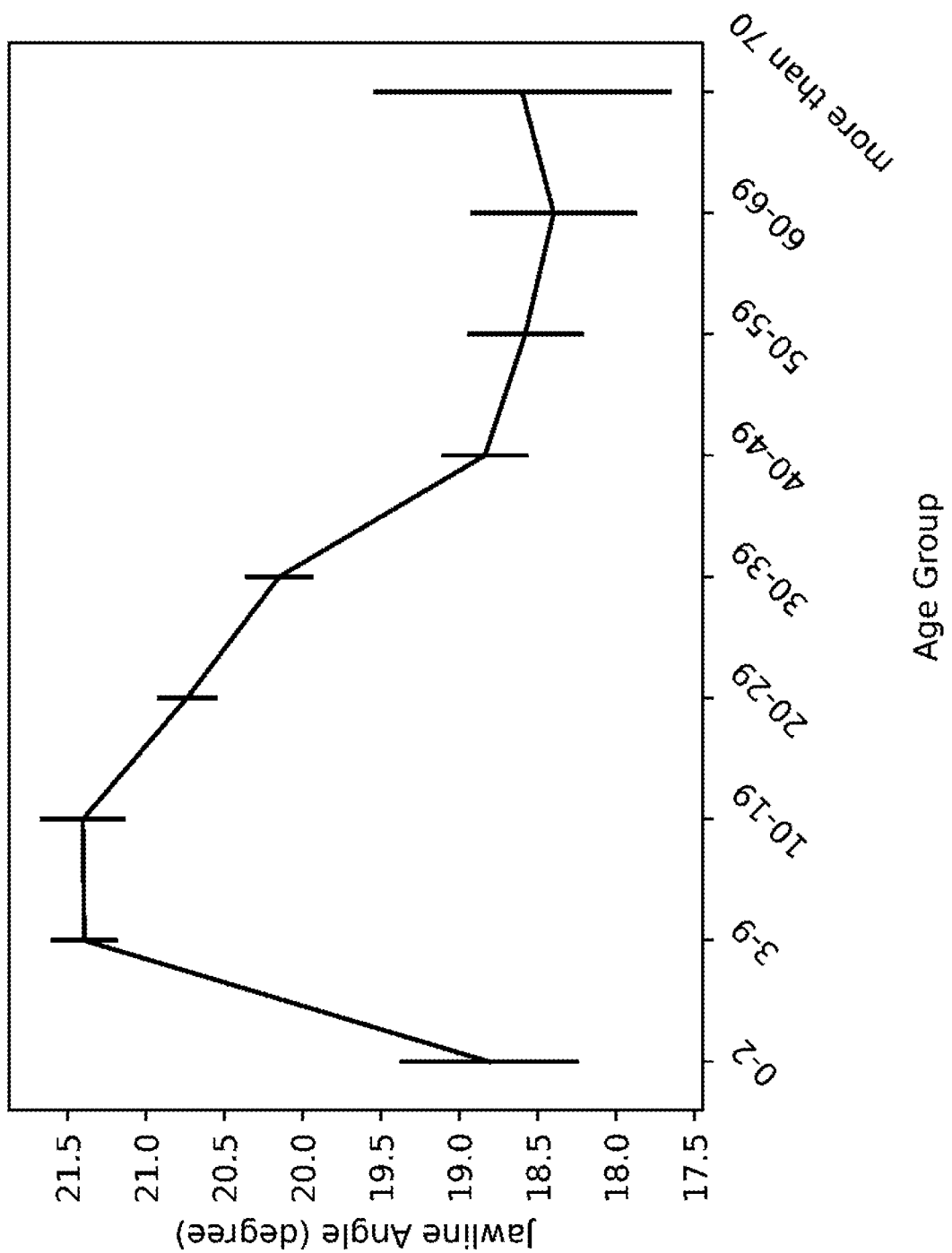
FIG. 4 shows the calculated average jawline angle for each age bracket based on analysis of frontal images from the publicly available FairFace dataset.

Although the CACD dataset in the previous example is informative of the effect of aging on the jawline angle, there are two limitations in its population sampling: 1) it is strongly biased toward Caucasian faces, and 2) it is based on celebrities, who have a higher likelihood of corrective procedures to alter their jawline angle. To broaden the method and make it more inclusive and diversified to represent the general population, the jawline angle measurement method analysis was extended to another publicly available dataset which is not limited to celebrities, and specifically created to mitigate race bias with existing public face image datasets. This dataset is called the FairFace, which contains over 100,000 facial images with an emphasis on racial balance. Out of the dataset, 8604 images were clear frontal images suitable for use with the inventive methodology. Using the jawline angle analysis method described in Example 1, the average jawline angle was computed for each age bracket contained in the dataset. FIG. 4 shows the average jawline angle for each age bracket based on analysis of frontal images from publicly available FairFace dataset. The error bar represents 95% confidence interval.

As seen from the figure, the average jawline angles are 18.81, 21.39, 21.40, 20.74, 20.15, 18.84, 18.58, 18.40, and 18.60 for age groups 0-2, 3-9, 10-19, 20-29, 30-39, 40-49, 50-59, 60-69, and more than 70 years old, respectively. The average jawline angle decreases about 0.72 degrees every 10 years between age group 20-29 and age group 50-59. This result is consistent with previous example, and further demonstrates the generality of the jawline angle decrease with age.

What is claimed is:

1. A method of determining the effectiveness of a treatment on a face having a jawline and a chin, the method comprising:
   (a) providing a first front-facing image of the face prior to use of the treatment;
   (b) identifying a y-axis of the face, wherein the y-axis is defined by a line connecting the center position of the chin of the face through the center of the face;
   (c) identifying an x-axis of the face, wherein the x-axis is defined by a line that is positioned at a 90-degree angle from the y-axis and goes through the center of the chin of the face;
   (d) selecting a facial landmark along the jawline of the face;
   (e) identifying a facial landmark line, wherein the facial landmark line is defined by a line connecting the center position of the chin of the face to the facial landmark;
   (f) measuring the angle between the x-axis and the facial landmark line;
   (g) carrying out the treatment on the face;
   (h) providing a second front-facing image of the face after the treatment; and
   (i) repeating steps (b)-(f).

2. The method of claim 1, wherein the second front-facing image of the face after the treatment is taken at least one week after the treatment.

3. The method of claim 1, wherein additional front-facing images are provided and steps (b)-(f) are repeated at regular intervals.

4. The method of claim 1, wherein additional front-facing images are provided and steps (b)-(f) are repeated during a treatment period.

5. The method of claim 1, further comprising (j) comparing the angle between the x-axis and the facial landmark line before the treatment to the angle between the x-axis and the facial landmark line after the treatment.

6. The method of claim 1, wherein the treatment comprises application of an anti-aging product.

7. The method of claim 6, wherein the anti-aging product is a cream or lotion.

8. The method of claim 7, wherein the anti-aging product comprises one or more anti-aging active ingredients.

9. The method of claim 1, wherein the anti-aging product is applied as part of a regimen.

10. The method of claim 1, wherein the product and/or the regimen is modified after (i).

11. The method of claim 10, wherein the modification is selected from the group consisting of using a different product in substitution for the first product, using a new product in addition to the first product, changing the regimen, or changing the amount of time the product is left on the face, and combinations thereof.

12. The method of claim 1, wherein the treatment comprises an anti-aging procedure.

13. The method of claim 12, wherein the anti-aging procedure is selected from the group consisting of injection of one or more fillers, plastic surgery, a peel treatment, a laser treatment, light treatments, and combinations thereof.

* * * * *